United States Patent
Kitchenside

(10) Patent No.: US 7,826,307 B2
(45) Date of Patent: Nov. 2, 2010

(54) IDENTIFYING AN INTERNAL MULTIPLE GENERATOR IN A SUBTERRANEAN STRUCTURE

(75) Inventor: Philip Kitchenside, Orpington (GB)

(73) Assignee: WesternGeco L.L.C., Houston, TX (US)

( * ) Notice: Subject to any disclaimer, the term of this patent is extended or adjusted under 35 U.S.C. 154(b) by 70 days.

(21) Appl. No.: 12/171,725

(22) Filed: Jul. 11, 2008

(65) Prior Publication Data
US 2009/0092007 A1    Apr. 9, 2009

Related U.S. Application Data

(60) Provisional application No. 60/978,272, filed on Oct. 8, 2007.

(51) Int. Cl.
G01V 1/00    (2006.01)
(52) U.S. Cl. .......................................... 367/38; 367/73
(58) Field of Classification Search .................... 367/24, 367/37, 38, 73
See application file for complete search history.

(56) References Cited

U.S. PATENT DOCUMENTS

| | | | |
|---|---|---|---|
| 4,679,174 A * | 7/1987 | Gelfand | ........................ 367/73 |
| 5,757,723 A | 5/1998 | Gasparotto et al. | |
| 5,999,488 A | 12/1999 | Smith | |
| 6,219,621 B1 * | 4/2001 | Hornbostel | ................... 702/16 |
| 2005/0065758 A1 * | 3/2005 | Moore | ........................ 703/10 |

* cited by examiner

*Primary Examiner*—Jack Keith
*Assistant Examiner*—Krystine Breier

(57) ABSTRACT

A technique is provided for identifying an internal multiple generator in a subterranean structure. The technique includes injecting wavefields at different levels in the subterranean structure, where the different levels are proximate a predicted location of the internal multiple generator. Wavefields induced by the injected wavefields are recorded and the effect of the internal multiple generator based on the recorded wavefields is determined.

15 Claims, 4 Drawing Sheets

IDENTIFYING AN INTERNAL MULTIPLE GENERATOR IN A SUBTERRANEAN STRUCTURE

CROSS REFERENCE TO RELATED APPLICATION

This application claims the benefit under 35 U.S.C. §119 (e) to U.S. Provisional Patent Application Ser. No. 60/978, 272, entitled "IDENTIFYING AN INTERNAL MULTIPLE GENERATOR IN A SUBTERRANEAN STRUCTURE", which was filed on 8 Oct. 2007, and is hereby incorporated by reference in its entirety.

TECHNICAL FIELD

The invention relates to identifying a multiple generator in a subterranean structure.

BACKGROUND

Seismic surveying is used for identifying subterranean elements, such as hydrocarbon layers, fresh water aquifers, and so forth. In performing seismic surveying, seismic sources are placed at various locations on an earth surface or sea floor (or in a wellbore), with the seismic sources activated to generate seismic waves directed into a subterranean structure. Examples of seismic sources include explosives, air guns, or other sources that generate seismic (acoustic) waves. In a marine environment, seismic sources and sensors can be towed in water by a sea vessel.

The seismic waves generated by a seismic source travel into the subterranean structure, with a portion of the seismic waves reflected back to the surface (earth surface, sea floor, or wellbore surface) for receipt by seismic sensors (e.g., geophones). These seismic sensors produce signals that represent detected seismic waves. Signals from the seismic sensors are processed to yield information about the content and characteristic of the subterranean structure.

Recorded seismic data is often degraded by the presence of internal multiples (IMs) in the recorded seismic data. Internal multiples in the seismic data are caused by the presence of one or more internal multiple (IM) generators between the surface (earth surface or sea floor,) and a target reflector (such as a hydrocarbon layer, fresh water aquifer, and so forth). An IM generator is caused by changes in the density or velocity of the subterranean structure. The presence of an IM generator between the recording surface and a reflector causes multiple reflections to occur between the IM generator and the reflector. Thus, for example, a seismic wave that travels downwardly into the subterranean structure will have a portion that is reflected back from the IM generator, and have another portion that passes through the IM generator to a reflector. A seismic wave is then reflected from the reflector back up towards a recording surface (where seismic sensors are located). A portion of this reflected seismic wave travels through the IM generator to the recording surface. However, another portion of this reflected seismic wave is reflected back downwardly by the IM generator towards the reflector, which is then followed by further reflection from the reflector up towards the recording surface. Such reflections between the IM generator and reflector can occur multiple times. Seismic data due to the reflections between the IM generator and the reflector are referred to as internal multiples. The presence of internal multiples in the recorded seismic data pollutes the recorded seismic data and leads to decreased accuracy in surveying a subterranean structure.

SUMMARY

In general, according to an embodiment, a method of identifying an internal multiple generator in a subterranean structure includes injecting wavefields at plural levels in the subterranean structure, where the plural levels are proximate a predicted location of the internal multiple generator. The method further includes recording wavefields induced by the injected wavefields, and determining an effect of the internal multiple generator based on the recorded wavefields.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
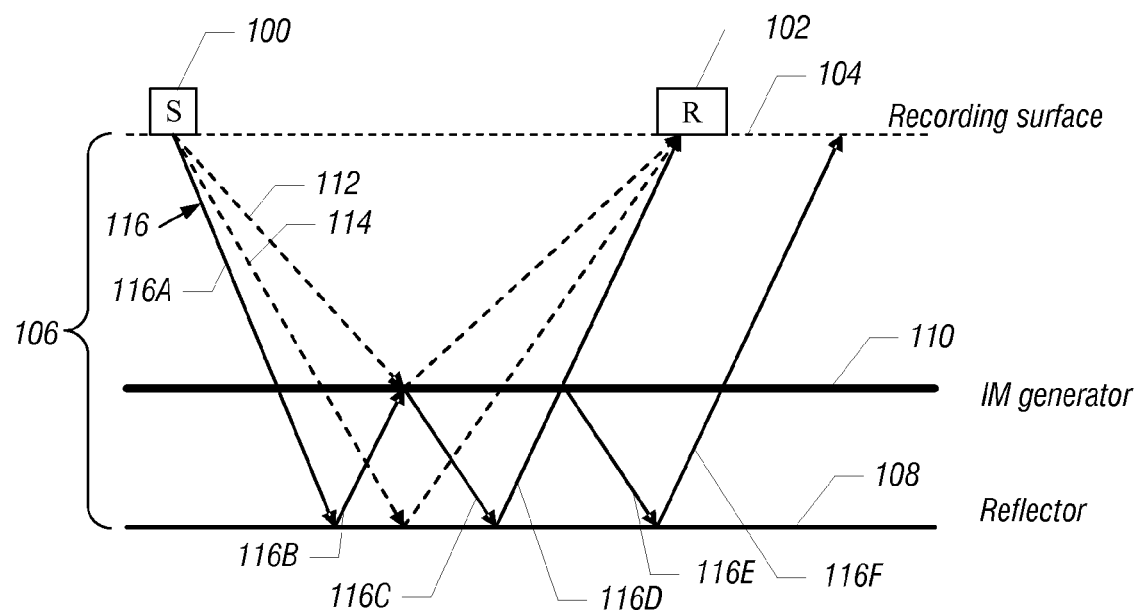
FIG. 1 illustrates various seismic waves in a subterranean structure that includes an internal multiple (IM) generator and a reflector.

FIG. 1 illustrates an example arrangement that includes a seismic source 100 (e.g., air gun, explosive, etc.) and a seismic receiver 102 (e.g., geophone) provided on a recording surface 104 (which can be an earth surface or sea floor). A single seismic source 100 and a single seismic receiver 102 are depicted for purposes of discussion. Note that multiple seismic sources and/or seismic receivers can be provided in other implementations. Although depicted as being horizontal in FIG. 1, note that the recording surface 104 can actually have other orientations in other contexts A subterranean structure 106 is located beneath the recording surface 104.

The subterranean structure 106 includes a reflector 108, which represents a target layer of interest (e.g., layer of hydrocarbons). Also depicted in FIG. 1 is an internal multiple (IM) generator 110 in the subterranean structure 106. The IM generator 110 causes internal multiples to be produced in seismic data recorded by the seismic receiver 102. The IM generator 110 is present due to changes in density or velocity in different layers of the subterranean structure 106. The subterranean structure 106 can include multiple IM generators. However, for ease of understanding, only one IM generator 110 is depicted in FIG. 1. Techniques according to some embodiments of the invention can be applied to a subterranean structure that includes multiple IM generators.

Although depicted as being planar in structure, note that the recording surface 104, IM generator 110, and reflector 108 can alternatively have non-planar geometries.

FIG. 1 also shows three paths along which seismic waves propagate in the subterranean structure 106. The paths include two primary paths 112, 114 (represented by dashed lines) and an internal multiple path 116 (represented by a solid line and having a general "W" shape). The seismic source 100 generates a seismic wave that is directed into the subterranean structure 106. Following the first primary path 112, a first portion of this injected seismic wave from the seismic source 100 is reflected from the IM generator 110 back to the recording surface 104, and recorded by the seismic receiver 102. In the second primary path 114, another portion of the source injected seismic wave passes through the IM generator 110 and is reflected by the reflector 108 along path 114 back to the recording surface 104. The reflected seismic wave along the second primary path 114 is also recorded by the seismic receiver 102. Note that the recorded seismic data according to the primary reflections along the primary paths 112, 114 are desired seismic data that can be used to accurately characterize the subterranean structure 106 to determine whether or not the target reflector 108 is present.

However, as noted above, presence of the IM generator 110 causes reflections between the IM generator 110 and reflector 108 to cause presence of internal multiples in the recorded seismic data. The internal multiple path 116 depicted in FIG. 1 includes path portions 116A, 116B, 116C, 116D, 116E, and 116F. The reflected seismic wave received by the receiver 102 over path portions 116A, 116B, 116C, and 116D cause a first-order internal multiple to be present in the recorded seismic data. The path portion 116A extends from the seismic source 100 through the IM generator 110 to the reflector 108. The reflector 108 reflects the seismic wave received over path portion 116A towards the IM generator 110 along path portion 116B. The IM generator 110 then reflects the seismic wave received over path portion 116B back down towards the reflector 108 along path portion 116C. The reflector 108 then reflects this internally reflected seismic wave (received over path portion 116C) back towards the recording surface 104 along path portion 116D. The reflected seismic wave received by the seismic receiving 102 over path portion 116D is an internal multiple (first-order internal multiple).

Note that additional reflections can occur between the IM generator 110 and reflector 108. Thus, the seismic wave that travels along path portion 116D can actually have a seismic wave portion reflected back from the IM generator 110 back towards the reflector 108 along path portion 116E, which then causes a reflection back up to the recording surface 104 along path portion 116F. This further reflected seismic wave received over path portion 116F is a second-order internal multiple seismic wave. Further reflections between the IM generator and reflector produce third-order, fourth-order, and additional higher-order internal multiple seismic waves that may be recorded by the seismic receiver 102. At some point, the higher-order internal multiple seismic waves are attenuated sufficiently that their contribution to the overall recorded seismic data can be considered insignificant.

An "internal multiple" caused by the internal multiple generator 110 thus refers to any k-th order (k=1, 2, . . . ) internal multiple seismic wave produced by seismic wave reflections between the internal multiple generator 110 and the reflector 108.

To be able to remove internal multiple effects of an IM generator, the actual location of the IM generator has to be first determined. In accordance with some embodiments, to identify or estimate the actual location of the IM generator 110, a number of candidate horizons corresponding to possible locations of the IM generator 110 are considered. For each such candidate horizon considered, plural levels proximate the candidate horizon are defined. As discussed further below, simulated seismic signals are injected at the plural levels proximate the candidate horizon to allow a determination of the significance of the corresponding candidate horizon in producing internal multiples. Of the multiple candidate horizons, the one that produces the most significant internal multiple effect is considered the most likely horizon that corresponds to the actual location of the internal multiple 110 in the subterranean structure 106.

Figure 2:
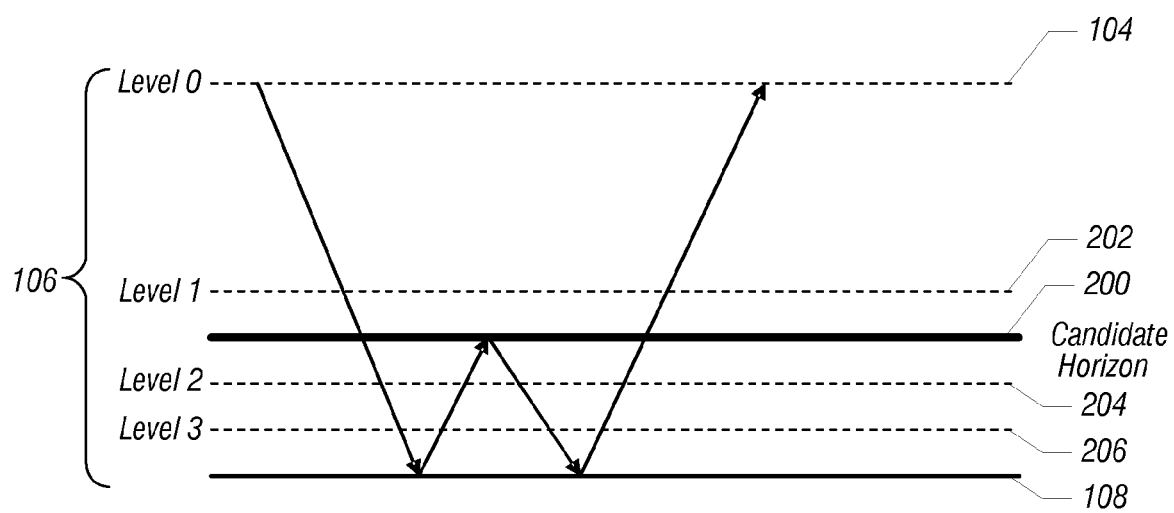
FIG. 2 illustrates the definition of multiple levels proximate a candidate horizon representing a predicted location of the IM generator to determine an effect of the candidate horizon, in accordance with an embodiment.

As depicted in FIG. 2, a candidate horizon 200 corresponding to a possible location of the IM generator 110 is identified. Then, three levels 202, 204, and 206 (corresponding to levels 1, 2, and 3, respectively) proximate the candidate horizon 200 are defined. Note that the reflector 108 is represented as being below each of the three levels 202, 204, and 206. Level 1 is located above the candidate horizon 200, level 2 is located below the candidate horizon 200, and level 3 is located below level 2.

The candidate horizon 200 and the three levels 202, 204, and 206 are simulated using a simulation system, which can be implemented with software executable on a computer, in one example implementation. The different levels 202, 204, and 206 are provided sufficiently close to the candidate horizon 200 to avoid significant impedance contrasts between the levels 202, 204, and 206, and the candidate horizon 200.

In the simulation system, the subterranean structure 106 is modeled with a predefined model, which can be a velocity-depth model that models velocities in the subterranean structure 106 at various depths. In another embodiment, the model used to represent the subterranean structure 106 can also include density information along with the velocity information. Thus, the model can indicate variations in densities at different depths of the subterranean structure 106, in addition to variations in wavefield velocities at the different depths. Either of these models can be used with techniques according to some embodiments. In the ensuing discussion, reference is made to a "subterranean model," which can refer to either a velocity-depth model or a density/velocity-depth model.

In FIG. 2, the recording surface 104 is considered level 0. Levels 1, 2, and 3 are in the subterranean structure 106, whereas level 0 is outside the subterranean structure 106 (at the recording surface 104). Generally, according to some embodiments, the simulation system models the injection of wavefields at the different levels depicted in FIG. 2, including levels 0, 2, and 3. The injected wavefield at level 0 corresponds to the wavefield produced by the seismic source 100 (FIG. 1) at the recording surface 104. The injected wavefields at levels 2, and 3 are described further below.

Moreover, for each different injection at the different levels, a different subterranean model is used, which is also further described below. The injected wavefields at the different levels induce wavefields at other levels that are then recorded at various levels (by the simulation system). These induced wavefields are then used to estimate seismic data at the recording surface 104, where internal multiples have been removed from the estimated seismic data; in other words, the estimated seismic data includes the primary reflections over the two primary paths 112 and 114 (in FIG. 1) with internal multiple reflections (along path 116) removed.

The estimated seismic data that is free of internal multiples (generated by the candidate horizon) is then compared either with actual observed seismic data (recorded in the field) or data computed using a standard simulation, to determine the effect of the corresponding candidate horizon on the recorded seismic data. If the estimated seismic data is close to the observed seismic data, then that indicates the corresponding candidate horizon has a relatively small internal multiples effect and is thus unlikely to represent the location of the IM generator 110. On the other hand, if there is a relatively large deviation (in the form of the amount of energy missing, for example) between the estimated seismic data and the observed seismic data, then that indicates a more significant internal multiples effect and an increased likelihood that the corresponding horizon candidate represents the actual location of the IM generator 110.

If the candidate horizon 200 has a small effect on the recorded seismic data and thus indicates that the candidate horizon 200 does not correspond to the actual location of the IM generator 110, then another candidate horizon would be considered with the process discussed above repeated to determine the effect of the other candidate horizon on the recorded seismic data. This procedure is iteratively repeated for different candidate horizons until the "most important" candidate horizon is identified that best represents the actual location of the IM generator 110. This "best" candidate horizon is referred to as the dominant multiple generating horizon.

Once the predicted location of the IM generator 110 is identified using techniques according to some embodiments, the IM generator information can be input to an internal multiple predictor that predicts effects of the IM generator 110 to enable such unwanted predicted effects to be removed from the recorded seismic data (recorded in the field). Many different types of internal multiple generator predictors are available and can be used for the purpose of removing unwanted effects of an IM generator from recorded seismic data.

Figure 3A:
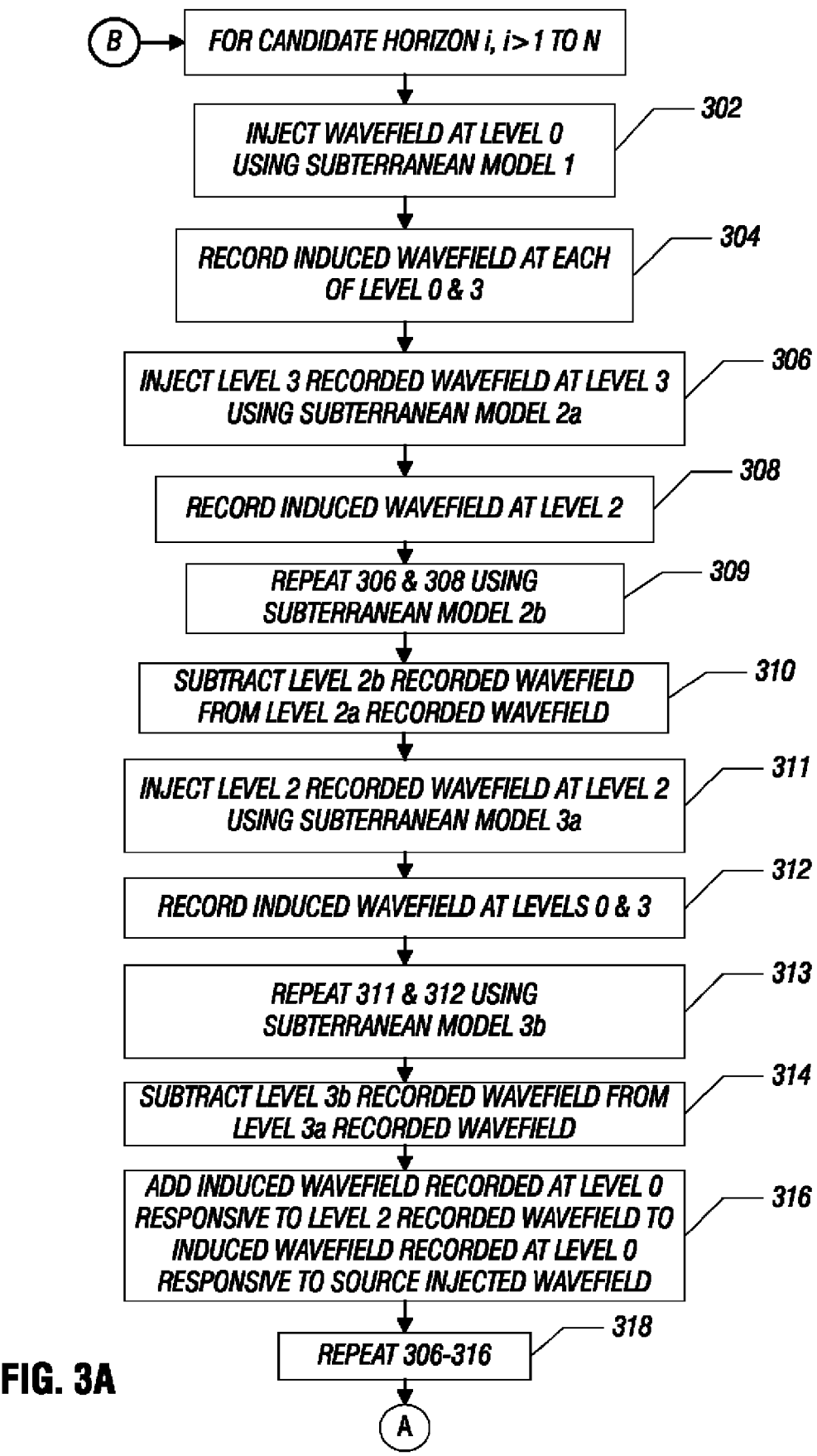
FIGS. 3A-3B depict a flow diagram of a process of determining an effect of a candidate horizon, according to an embodiment.
Figure 3B:
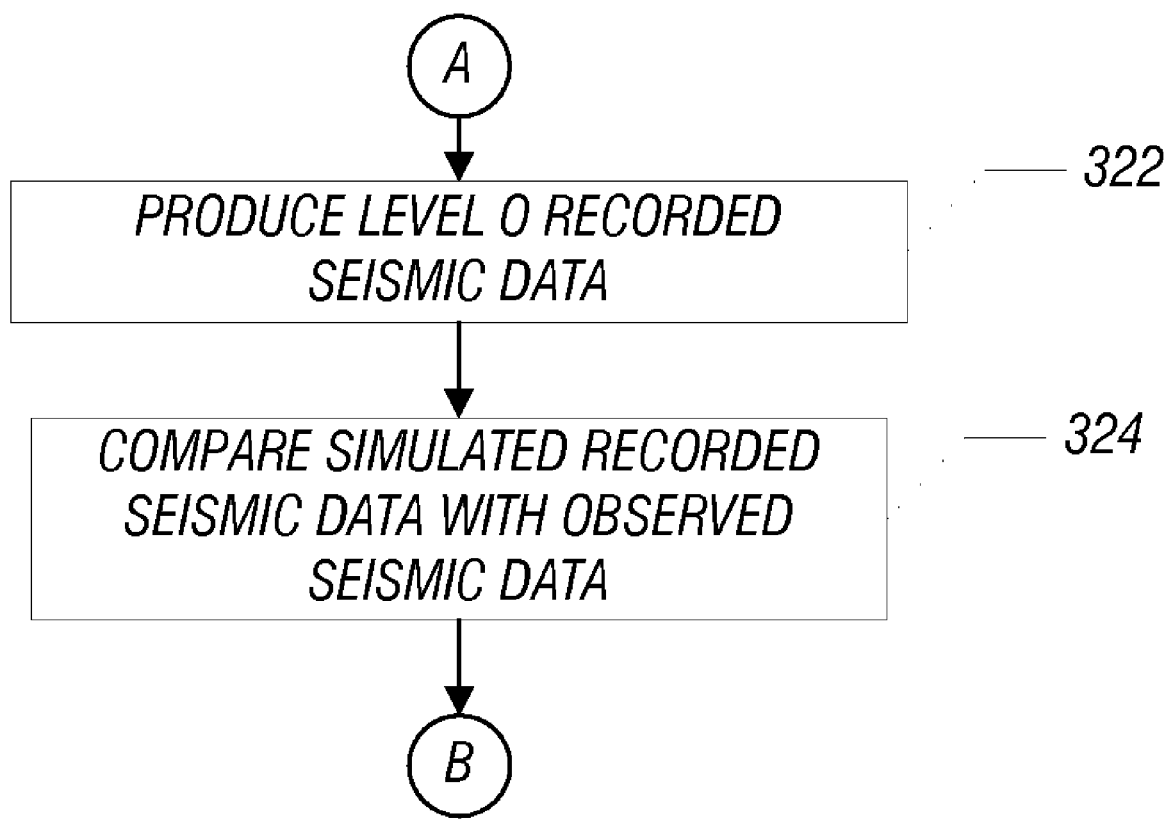

FIGS. 3A-3B show a procedure according to an embodiment for determining an effect of a candidate horizon on seismic data. The FIGS. 3A-3B procedure is repeated multiple times for multiple candidate horizons for the purpose of identifying which of the candidate horizons is the most important horizon in terms of internal multiples effect. As depicted in FIGS. 3A-3B, the procedure is repeated for each candidate horizon i, where i=1 to N (N being a predefined number representing the number of candidate horizons to be considered). The N candidate horizons are selected based on well logging data or on previously acquired models of the subterranean structure. The procedure of FIGS. 3A-3B is performed by the simulation system according to some embodiments.

A source wavefield (e.g., a pressure and associated particle-velocity wavefield) is injected (at 302) downwardly at level 0 (which is at the recording surface 104). Injecting a wavefield "downwardly" refers to injecting the wavefield in a general direction that at least has a downward component. This injected source wavefield at level 0 models the actual wavefield that would have been injected by the seismic source 100 (FIG. 1) at the recording surface 104.

Using a subterranean model, the simulation system models the propagation of the wavefield in the subterranean structure 106, as well as reflections of the wavefields in the subterranean structure 106. The injected source wavefield induces wavefields at each of levels 0 and 3. The subterranean model used in injecting the wavefield at level 0 is subterranean model 1, in which the original subterranean model has been modified to assume that the velocity field below level 3 is replicated homogenously (in other words, the velocity field is assumed to be constant (in the depth-direction) below level 3—more precisely, consider an arbitrary location on level 3 and also any location vertically beneath it, then the wavefield velocity at these two locations will be the same and be equal to the velocity value at the arbitrary location as specified by the original subterranean model. If the subterranean model is a combined density and velocity-depth model, then both the density field and the velocity field below level 3 would be replicated homogenously in subterranean model 1. In other words, both the density and velocity fields would be assumed to be constant below level 3. In the ensuing discussion, it is assumed that the subterranean models used are velocity-depth models; however, note that the procedure can also be used with density and velocity-field models.

The subterranean model 1 effectively eliminates the presence of the reflector 108 in FIG. 1 and in the general case eliminates the presence of all reflectors beneath the designated IM generator. Thus, the induced seismic wave recorded at level 3 is the injected source wavefield modified by the characteristics of the subterranean structure 106 as represented by subterranean model 1 after the injected source wavefield has propagated through the subterranean structure 106 from level 0 to level 3. In FIG. 1 the induced wavefield at level 0 is the wavefield reflected from the IM generator (as represented by the candidate horizon 200) in the subterranean structure 106 in response to the injected source wavefield. In the general case the induced wavefield at level 0 is the reflected wavefield due to all reflectors above and including the IM generator.

The induced wavefields at levels 0 and 3 responsive to the injected source wavefield (302) are recorded (at 304) by the simulation system. Note that the recordings of the induced wavefields are performed by the simulation system. Effectively, in FIG. 1, the recorded wavefield at level 0 represents the first primary reflection (path 112) from the IM generator (represented by candidate horizon 200) without any contribution from the reflector 108. In other words, for the general case, the recorded wavefield at level 0 simulates data which would be recorded at level 0 due to the structure above and including the IM generator. The recorded wavefield at level 3 simulates data that has propagated from level 0 through the structure above and including the IM generator to level 3.

The induced wavefield recorded at level 3 is referred to as a "level 3 recorded wavefield." Next, the level 3 recorded wavefield is injected (at 306) at level 3. In other words, the simulation system pretends that there is source at level 3 that injects the level 3 recorded wavefield. Alternatively, the wavefield injected at level 3 can be the level 3 wavefield computed at step 314, discussed further below. In step 306, the subterranean model used is subterranean model 2a, in which the original subterranean model has been modified to assume that the velocity field has been replicated homogeneously above level 2 (in other words, the velocity field above level 2 is assumed to be the same as the velocity field at level 2). Effectively, subterranean model 2a assumes that the IM generator (represented by candidate horizon 200) is not present.

However, unlike subterranean model 1, the reflector 108 is present in the subterranean model 2a. The injected level 3 recorded wavefield is directed downwardly toward the reflector 108. The induced wavefield reflected from the reflector 108 (in response to the injected level 3 recorded wavefield), in which subterranean model 2a has been used, is recorded (at 308) by the simulation system at level 2 (referred to as the "level 2a recorded wavefield").

Next, the tasks 306 and 308 are repeated (at 309) using a different subterranean model 2b, in which the velocity field above level 2 is assumed to be the same as the velocity field at level 2, and the velocity field below level 3 is assumed to be the same as the velocity field at level 3. Effectively, subterranean model 2b assumes that the IM generator (represented by candidate horizon 200) is not present, and that reflectors are not present below level 3. The induced wavefield at level 2 (with subterranean model 2b used) is recorded by the simulation system (referred to as the "level 2b recorded wavefield"). The level 2b recorded wavefield is subtracted (at 310) from the level 2a recorded wavefield to produce a "level 2 recorded wavefield." Effectively, tasks 306-310 simulates the data which would be recorded at level 2 due to the wavefield being injected at level 3 and reflected by the structure below the IM generator.

Next, the level 2 recorded wavefield is injected (at 311) at level 2 (in an upward direction). In other words, the simulation system pretends that a source is provided at level 2, where this source injects the level 2 recorded wavefield which is directed upwardly towards the recording surface 104. The injection of the level 2 recorded wavefield at level 2 is simulated using simulation model 3a (in which the velocity wavefield is replicated homogeneously below level 3). The homogeneous replication of the velocity field below level 3 removes the effect of reflectors below level 3. The induced wavefield (using subterranean model 3a) in response to the injected level 2 recorded wavefield is recorded (at 312) at level 0 and level 3. The recorded wavefield at level 3 is referred to as a "level 3a recorded wavefield."

Next, tasks 311 and 312 are repeated (at 313), except using a different subterranean model 3b, in which the velocity wavefield is replicated homogeneously above and below levels 1 and 3, respectively. The homogeneous replication of the velocity field above level 1 removes the effect of any other IM generators between the candidate horizon under consideration and the recording surface 104. The homogeneous replication of the velocity field below level 3 removes the effect of reflectors below level 3. The induced wavefield (using subterranean model 3b) in response to the injected level 2 recorded wavefield is recorded at level 3. This recorded wavefield at level 3 is referred to as a "level 3b recorded wavefield."

The level 3b recorded wavefield is then subtracted (at 314) from the level 3a recorded wavefield to produce a "level 3c recorded wavefield." Tasks 311-314 simulate the data that would be recorded at level 3 due to the wavefield being injected at level 2 and reflected by the structure above the IM generator. Down-going reflections from the IM generator are removed but transmission across the IM generator is included. It also simulates data that has been propagated from level 2 up through the structure above and including the IM generator and is recorded at level 0. Transmission across the IM generator is included.

Next, the induced wavefield recorded (at 312) at level 0 that is responsive to the level 2 recorded wavefield is added (at 316) to the level 0 recorded data that was recorded earlier at 304. At this stage, the algorithm has removed internal multiples due to seismic waves which have crossed the IM generator once in the downward direction, are then reflected back to the IM generator (by the subterranean structure beneath the IM generator) where they are reflected downwards before traveling back to the level 0 recording surface. Steps 306-316 are then repeated (at 318), with the level 0 recorded data from the second iteration of the process of steps 306-316 added to the level 0 recorded data from the first iteration of the process of steps 306-316. The process of repeating steps 306-316 will remove internal multiples due to seismic waves which have crossed the IM generator three times before being reflected downwards by the IM generator. These seismic waves have crossed the IM generator once in the downward direction, have then been reflected in the upward direction back past the IM generator, are then reflected downwards past the IM generator, have been reflected back to the IM generator (by the subterranean structure below the IM generator), where they have been reflected downwards before traveling back to the level 0 recording level. If desired, steps 306-316 may be repeated a number of times. Each repeat will remove internal multiples due to seismic waves making two further crossings of the IM generator before being reflected downwards by it. For example, if steps 306-316 are carried out three times, internal multiples due to seismic waves which have traveled past the IM multiple generator once, three times or five times, before being reflected downwards by the IM generator and then traveling back to the level 0 recording surface will be removed.

Level 0 recorded seismic data resulting from M iterations of the process of steps 306-316 is produced (at 322) by the simulation system. The produced level 0 recorded seismic data represents simulated recorded data at the recording surface 104 with internal multiple effects removed. The simulated recorded seismic data is then compared (at 324) to observed seismic data recorded in the field (or possibly data obtained using a standard finite-difference simulation) to determine the effect of the candidate horizon 200 on the seismic data to determine likelihood of the candidate horizon 200 representing the actual location of the internal multiple generator 110 of FIG. 1.

The next candidate horizon i is then processed according to 302-324. After performing the FIGS. 3A-3B procedure for the N candidate horizons, the results from the simulation system are then used to compare the relative effects of the different candidate horizons to identify which of the candidate horizons is responsible for the most internal multiple energy. This most dominant horizon is selected as the most likely location of the actual IM generator 110.

The simulation system according to some embodiments uses acoustic-wave equations to compute a sequence of finite-difference modeling simulations, where the sequence refers to the simulations performed for injected wavefields at levels 0, 2, 3. The acoustic-wave equations use parameters (density and/or velocity fields as functions of depth in the subterranean structure) to simulate the behavior of wavefields in the subterranean structure. The results of the simulations are combined in such a way as to remove internal multiples due to an internal multiple horizon, while leaving intact data due to primary reflections from the internal multiple horizon and elsewhere in the subterranean structure.

Figure 4:
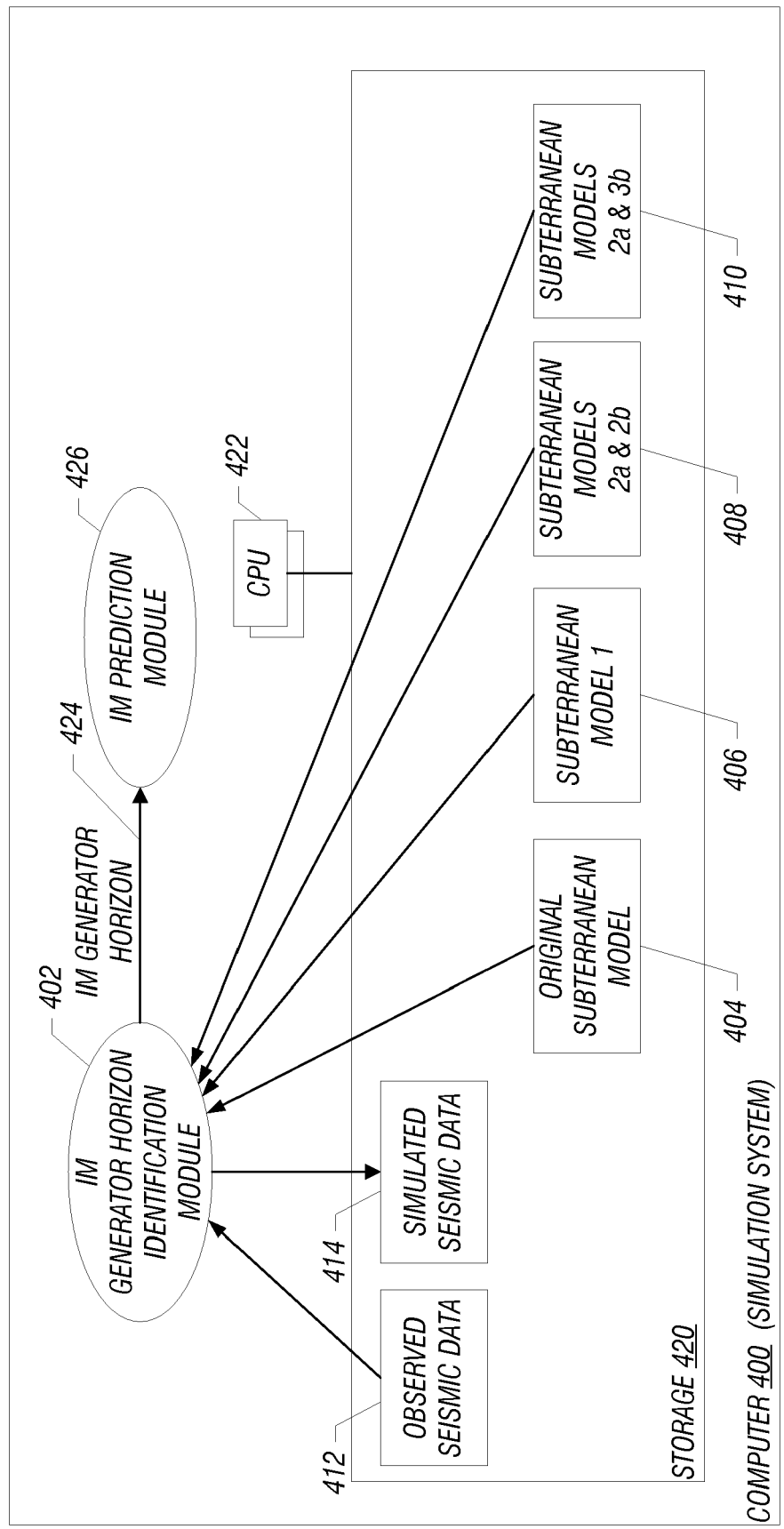
FIG. 4 is a block diagram of a computer that incorporates software to perform a process according to an embodiment.

FIG. 4 shows a block diagram of a computer 400 that is used to implement the simulation system according to some embodiments. The computer 400 includes an IM generator horizon identification module 402 that performs the tasks depicted in FIGS. 3A-3B. Inputs to the IM generator horizon identification module 402 include the original subterranean model 404 and subterranean models 1-3 (406, 408, and 410), each stored in storage 420. Another input to the IM generator horizon identification module 402 is observed seismic data 412. Simulated seismic data 414 produced by the IM generator horizon identification module 402 is also stored in storage 420.

The IM generator horizon identification module 402 can be software executable on one or more central processing units (CPUs) 422. The IM generator horizon identification module 402 helps select, from among multiple candidates horizons, the best horizon to represent the location of the actual IM generator. This best candidate is output (at 424) to an IM prediction module 426, which can also be implemented as software. The IM prediction module 426 takes as input the predicted location of the candidate horizon provided at 424, and from this, predicts effects of the IM generator on recorded seismic data such that effects due to internal multiples generated by the IM generator can be removed from recorded seismic data in the field.

Instructions of software described above (including horizon identification module 402 and IM prediction module 426 of FIG. 4) are loaded for execution on a processor (such as one or more CPUs 422 in FIG. 4). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of identifying an internal multiple generator in a subterranean structure, comprising:
    injecting wavefields at plural levels in the subterranean structure, wherein the plural levels are proximate a predicted location of the internal multiple generator;
    recording wavefields induced by the injected wavefields, wherein the injecting and recording are simulated using a simulation system comprising a computer; and
    determining, by the simulation system comprising the computer, an effect of the internal multiple generator based on the recorded wavefields,
    wherein the internal multiple generator is represented by a first candidate horizon that indicates a first possible location of the internal multiple generator;
    repeating the injecting, recording, and determining for other candidate horizons that indicate other possible locations of the internal multiple generator; and
    comparing the determined effects for the corresponding candidate horizons and identifying one of the candidate horizons based on the comparing, the identified one candidate horizon representing a predicted location for the internal multiple generator.

2. The method of claim 1, further comprising:
    injecting a wavefield at a first level that is outside the subterranean structure; and
    recording an induced wavefield at the first level in response to the first level injected wavefield, wherein the induced wavefield at the first level represents a reflected wavefield from reflectors above and including the internal multiple generator.

3. The method of claim 2, further comprising recording, at a second level that is one of the plural levels in the subterranean structure, a wavefield induced by the first level injected wavefield.

4. The method of claim 3, wherein injecting the wavefields at the plural levels in the subterranean structure comprises injecting a wavefield at the second level, and wherein recording the wavefields induced by the injected wavefields at the plural levels in the subterranean structure comprises recording, at a third level that is one of the plural levels, a wavefield induced by the second level injected wavefield.

5. The method of claim 4, wherein injecting the wavefield at the second level comprises injecting the second level recorded wavefield at the second level.

6. The method of claim 4, wherein injecting the wavefields at the plural levels in the subterranean structure comprises injecting a wavefield at the third level, and wherein recording the wavefields induced by the injected wavefields at the plural levels in the subterranean structure comprises recording, at the first level, a wavefield induced by the third level injected wavefield.

7. The method of claim 6, wherein injecting the wavefield at the third level comprises injecting a wavefield computed based on the recorded wavefield at the third level.

8. The method of claim 7, wherein injecting the wavefield at the second level and recording the wavefield induced by the second level injected wavefield are according to a first subterranean model.

9. The method of claim 8, further comprising:
    injecting another wavefield at the second level and recording, at the third level, another induced wavefield in response to the another wavefield injected at the second level, according to a second subterranean model; and
    subtracting the recorded wavefield according to the first subterranean model from the recorded wavefield according to the second subterranean model to produce the injected wavefield at the third level.

10. The method of claim 6, further comprising combining the recorded reflected wavefield at the first level induced by the third level injected wavefield, with the recorded reflected wavefield at the first level induced by the first level injected wavefield to produce an output wavefield, wherein the output wavefield has internal multiples removed.

11. The method of claim 1, further comprising generating, based on the recorded wavefields, an output wavefield that represents primary seismic wave reflections from the internal multiple generator and a target reflector in the subterranean structure, wherein the output wavefield does not include internal multiples produced by reflections between the internal multiple generator and a reflector in the subterranean structure.

12. The method of claim 11, wherein determining the effect of the internal multiple generator comprises comparing the generated output wavefield with an observed recorded wavefield.

13. The method of claim 1, further comprising providing the predicted location of the internal multiple generator to a module that removes effects of the internal multiple generator from recorded seismic data, wherein the effects of the internal multiple generator include internal multiples caused by reflections between the internal multiple generator and a reflector in the subterranean structure.

14. The method of claim 1, wherein injecting the wavefields at the plural levels uses different velocity-depth models to represent the subterranean structure for different ones of the injecting.

15. The method of claim 1, wherein injecting the wavefields at the plural levels uses different velocity- and density-depth models to represent the subterranean structure for different ones of the injecting.

* * * * *